Jan. 26, 1937. V. R. CLARK 2,069,028
MACHINERY BELT
Filed April 18, 1935
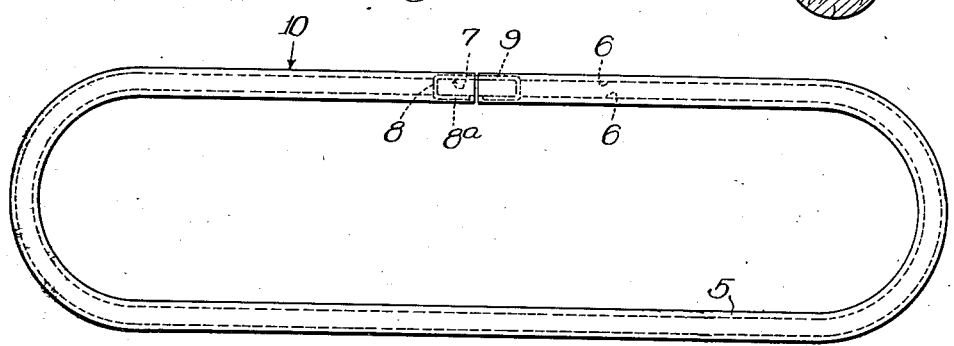
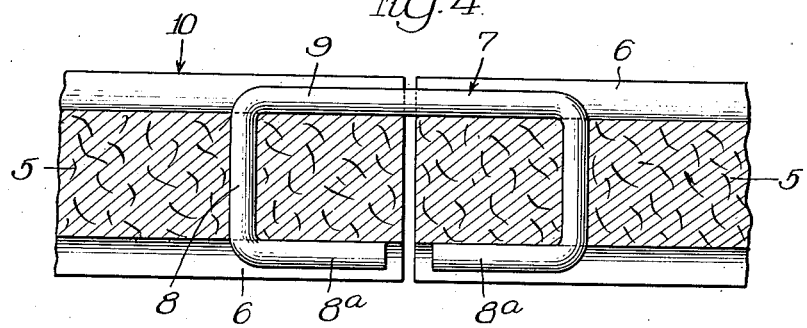
Inventor:
Victor R. Clark,
By Brown, Jackson, Boettcher & Dienner
attys.

Patented Jan. 26, 1937

2,069,028

UNITED STATES PATENT OFFICE 2,069,028

MACHINERY BELT

Victor R. Clark, Chicago, Ill.

Application April 18, 1935, Serial No. 16,969

2 Claims. (Cl. 74—238)

This invention relates to belts, and has to do with belts and belting for use in driving machinery and analogous purposes.

It is the common practice, in making machinery belts of circular, or approximately circular cross-section, to secure the ends of a suitable length of belting together by means of a securing hook of approximately U-shape, the arms of this hook being inserted through the belting and then bent over at right angles. In a belt made in this manner, the securing hook projects beyond the outline of the belting at opposite sides thereof and, when the hook passes about a pulley over which the belt is trained, slapping and slipppage of the belt is caused. Also, in many instances it is necessary to arrange the belt with the runs thereof crossed and in contact one with the other. With the belt crossed, the hook is in rubbing contact with the belt and the ends of the bent over portions of the arms of the hook, particularly, cut into the belt and soon render it unfit for use. A further objection to a belt made in the usual manner above referred to is that care must be exerted in punching the holes in the end portions of the belting for reception of the arms of the securing hook. If these holes are not accurately punched so as to lie in the transverse central plane of the belting, the ends of the belt will be out of alignment, which aggravates the slapping and slippage of the belt in passing around the pulley.

The object of my invention is to provide a novel form of belting and belt for machinery, in which the above noted objections to the present type of machinery belts are obviated. A further object is to provide a novel form of belting which may be cut to any desirable length and the ends of the resulting length of belting secured together with expedition and facility and in such manner that the securing means is disposed within the outline of the belting, avoiding all objectionable projections. Further objects and advantages of my invention will appear from the detail description.

In the drawing:—

Figure 1 is a fragmentary plan view of a length of belting embodying my invention;

Figure 2 is a section taken substantially on line 2—2 of Figure 1, on an enlarged scale;

Figure 3 is an elevational view of a machinery belt embodying my invention;

Figure 4 is a central lengthwise sectional view through the end portions of the belt of Figure 3, on an enlarged scale, taken in the plane of the fastening hook, the latter being shown in elevation.

I have illustrated my invention, by way of example, as applied to leather belting and belts, though it is capable of application to belts formed of other suitable materials. In Figure 1 I have shown a length of leather belting 5, which may be of any suitable commercial length. This belting is of circular cross-section, as shown in Figure 2, and is provided with two diametrically opposite grooves 6 which extend the full length of the belting 5. In order to make a belt, the belting 5 is cut to suitable length and suitable holes or openings are then punched through the length of belting, adjacent the ends thereof. These holes are punched in the plane of the grooves 6, which, being disposed in the central transverse plane of the belting, assure that the holes for reception of the arms of the securing hook are accurately positioned centrally of the belting transversely thereof. The ends of the belting are then secured together by means of a securing hook 7 of approximately U-shape, arms 8 of this hook passing through the end portions of the belting centrally thereof, and the terminal portions 8a of these arms being bent at right angles and disposed within groove 6 at one side of the belt, bight element 9 of the securing hook being disposed within groove 6 at the opposite side of the belting. The complete belt, designated 10 in Fig. 3, comprises a suitable length of belting 5, the end portions of which are secured together by the hook 7, the latter being disposed entirely within the outline of the belt.

Since the securing hook is disposed entirely within the outline of the belt, as above noted, slapping and slippage of the belt, in its travel around the pulley, is effectively eliminated. Further, if the runs of the belt are crossed, no injury to the belt results from the fastening means. By having the grooves 6 extend the full length of the belting, the latter may be cut into any length required and the end portions of each length may be secured together in the above manner to produce a belt, the grooves 6 providing convenient guide means which assure accurate punching of the holes or openings for reception of the arms of the securing hook, in addition to providing means effective to prevent projection of any element of this hook beyond the outline of the belt, as previously noted. While I have illustrated my invention as applied to leather belting of circular cross-section, it can be applied to advantage to belting of more or less oval or other cross-section and is also well suited for use with belting of other suitable material than leather. The grooves 6, when applied to leather belting, are conveniently formed by passing the belting through a suitable machine provided with appropriate cutting means for forming the grooves. It will be understood, however, that these grooves may be formed in any other suitable manner, such as by rolling or pressing them into the belting.

What I claim is:—

1. As a new article of manufacture, an endless belt comprising a length of belting provided with two grooves extending the full length of said length of belting at opposite sides and in the plane of the neutral axis thereof, said grooves being formed by removal of the material of the belting with consequent thinning thereof in the plane of said grooves, said belting having its ends secured together by a hook of substantially U-shape having its arms inserted through the ends of the belting in the plane of said grooves, the bight portion of said hook fitting snugly within the end portions of one groove and the terminal portions of the arms of said hook being bent over and fitting snugly with the end portions of the other groove, said hook being disposed entirely within the outline of said belting and the end portions of the latter remaining undistorted by said hook.

2. As a new article of manufacture, an endless round leather belt comprising a length of leather belting of circular cross-section provided with two diametrically opposite grooves extending the full length thereof, said grooves being formed by removal of the material of the belting with consequent thinning thereof in the plane of said grooves, said belting having its ends secured together by a hook of substantially U-shape having its arms inserted through the ends of the belting in the plane of said grooves, the bight portion of said hook fitting within the end portions of one groove and the terminal portions of the arms of said hook being bent over and fitting within the end portions of the other groove, said hook being disposed entirely within the outline of said belting and the end portions of the latter remaining undistorted by said hook, said belt being otherwise free for flexure throughout its length.

VICTOR R. CLARK.